United States Patent
Lin

(10) Patent No.: US 12,542,664 B2
(45) Date of Patent: Feb. 3, 2026

(54) NUMERICAL VALUE CONVERSION METHOD AND NUMERICAL VALUE CONVERSION SYSTEM WITH LOW HARDWARE COMPLEXITY AND HIGH OPERATION EFFICIENCY

(71) Applicant: PUFsecurity Corporation, Hsinchu County (TW)

(72) Inventor: Wen-Ching Lin, Hsinchu County (TW)

(73) Assignee: PUFsecurity Corporation, Hsinchu County (TW)

( * ) Notice: Subject to any disclaimer, the term of this patent is extended or adjusted under 35 U.S.C. 154(b) by 324 days.

(21) Appl. No.: 18/098,115

(22) Filed: Jan. 18, 2023

(65) Prior Publication Data

US 2024/0106646 A1    Mar. 28, 2024

(30) Foreign Application Priority Data

Sep. 27, 2022  (TW) .................................. 111136575

(51) Int. Cl.
*H04L 9/30* (2006.01)
*G06F 7/556* (2006.01)
*G06F 7/72* (2006.01)

(52) U.S. Cl.
CPC ............ *H04L 9/3006* (2013.01); *G06F 7/556* (2013.01); *G06F 7/727* (2013.01)

(58) Field of Classification Search
None
See application file for complete search history.

(56) References Cited

U.S. PATENT DOCUMENTS

| | | | |
|---|---|---|---|
| 2002/0074391 A1* | 6/2002 | Takano | G06F 9/3824 712/E9.046 |
| 2010/0040225 A1* | 2/2010 | Venelli | H04L 9/3066 380/28 |
| 2018/0062843 A1* | 3/2018 | Gopal | G06F 7/725 |

(Continued)

FOREIGN PATENT DOCUMENTS

| | | |
|---|---|---|
| CN | 102207847 B | 12/2013 |
| CN | 105099672 B | 1/2018 |
| TW | I263936 | 10/2006 |

OTHER PUBLICATIONS

Thampi et al. "Montgomery Algorithm for Modular Multiplication in Cryptosystems". International Journal of Advanced Research in Electrical, Electronics and Instrumentation Engineering. Mar. 2016. (Year: 2016).*

(Continued)

*Primary Examiner* — Scott B Christensen
(74) *Attorney, Agent, or Firm* — Winston Hsu

(57) ABSTRACT

A numerical conversion method for a public key cryptography system includes accumulating a first value by using a first modular addition loop according to the first value for generating a second value after a first predetermined loop count is reached, accumulating the second value by using a second modular addition loop according to the second value for generating a third value after a second predetermined loop count is reached, inputting the third value to a Montgomery modular exponentiation function for generating a Montgomery conversion parameter, and converting a first conversion value in an integer domain into a second conversion value in a Montgomery domain.

12 Claims, 6 Drawing Sheets

(56) References Cited

U.S. PATENT DOCUMENTS

2018/0097625 A1*  4/2018  Satpathy ................ H04L 9/302
2023/0246691 A1*  8/2023  Huang ................ H04B 7/0456
                                                      375/262

OTHER PUBLICATIONS

Bos et al. "Montgomery Arithmetic from a Software Perspective". Oct. 2017. (Year: 2017).*
Szu-Chi Chung ,A High-Performance Elliptic Curve Cryptographic Processor Over GF(p) With SPA Resistance ,Aug. 20, 2012.

* cited by examiner

NUMERICAL VALUE CONVERSION METHOD AND NUMERICAL VALUE CONVERSION SYSTEM WITH LOW HARDWARE COMPLEXITY AND HIGH OPERATION EFFICIENCY

BACKGROUND OF THE INVENTION

1. Field of the Invention

The present invention illustrates a numerical value conversion method and a numerical value conversion system, and more particularly, a numerical value conversion method and a numerical value conversion system with low hardware complexity and high operation efficiency.

2. Description of the Prior Art

With the rapid development of technology, confidential data is often encrypted and protected to prevent confidential data from being hacked or stolen. Therefore, a cryptosystem becomes an important design for data protection. In cryptography, it can be roughly categorized into a symmetric key encryption method and an asymmetric key encryption method. The asymmetric key cryptography can be regarded as public-key cryptography. The symmetric key cryptography uses one key for performing an encryption and a decryption function, or uses two keys that can be mutually induced from each other. However, compared with the public-key encryption, requiring a unique key by two terminals (i.e., encrypted terminal and decrypted terminal) is one of severe drawbacks of the symmetric-key encryption. In the public key cryptography, two keys are required. One key is a public key and the other key is a private key. The public key is used for performing the encryption function. The private key is used for performing the decryption function. A cipher text generated by encrypting an original text with the public key can only be decrypted by a corresponding private key for acquiring the original text. Therefore, the public key cryptography can provide a high data security level.

In the public key cryptosystem, an RSA (Rivest-Shamir-Adleman) encryption algorithm is a reliable encryption method. In the RSA encryption algorithm, when the key length is sufficient, it is hard to be cracked due to the difficulty of numerical factorization. In the RSA encryption algorithm and the public key cryptosystem, a Montgomery Multiplication Algorithm (or say, "Montgomery Algorithm") is the core technology. The Montgomery Algorithm can convert values in an integer domain to values in a Montgomery Domain. However, the Montgomery algorithm currently used can perform a numerical transformation function having a limited integer range. For example, the values to be converted are limited to $2^k$ and k is a value of the power of two. Therefore, in practice, the flexibility of current Montgomery applications is still insufficient.

Therefore, to develop a Montgomery numerical value conversion method with low complexity and no integer range limitation is an important design issue for the public key cryptosystem.

SUMMARY OF THE INVENTION

In an embodiment of the present invention, a numerical value conversion method for a public key cryptography system is disclosed. The numerical value conversion method comprises updating a first value by using a first modular addition loop according to the first value for generating a second value after a first predetermined loop count of the first modular addition loop is reached, wherein the second value is a modulo operation result of a power-of-two and a constant, updating the second value by using a second modular addition loop according to the second value for generating a third value after a second predetermined loop count of the second modular addition loop is reached, wherein the third value is a modulo operation result of a product of the second value and a power-of-two and the constant, inputting the third value to a Montgomery modular exponentiation function for generating a Montgomery conversion parameter, wherein the Montgomery conversion parameter is a modulo operation result of a square of the second value and the constant, and converting a first conversion value in an integer domain into a second conversion value in a Montgomery domain according to the Montgomery conversion parameter.

In another embodiment of the present invention, a numerical value conversion system for a public key cryptography system is disclosed. The numerical value conversion system comprises a processor and an operation circuit. The operation circuit is coupled to the processor. The operation circuit comprises a first multiplexer, a first register coupled to the first multiplexer, a modular adder coupled to the first multiplexer and the first register, and a Montgomery multiplier coupled to the first multiplexer and the first register. The processor controls the first multiplexer, the first register, and the modular adder for generating a first modular addition loop. After the first multiplexer receives a first value, the processor updates the first value by using the first modular addition loop according to the first value for generating a second value after a first predetermined loop count of the first modular addition loop is reached. The second value is a modulo operation result of a power-of-two and a constant. The second value is buffered in the first register. Then, the processor controls the first multiplexer, the first register, and the modular adder for generating a second modular addition loop. The processor updates the second value by using the second modular addition loop according to the second value for generating a third value buffered in the first register after a second predetermined loop count of the second modular addition loop is reached. The third value is a modulo operation result of a product of the second value and a power-of-two and the constant. Then, the processor controls the Montgomery multiplier for executing a Montgomery modular exponentiation function according to the third value. The Montgomery modular exponentiation function is used for generating a Montgomery conversion parameter. The Montgomery conversion parameter is a modulo operation result of a square of the second value and the constant. The processor converts a first conversion value in an integer domain into a second conversion value in a Montgomery domain according to the Montgomery conversion parameter.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
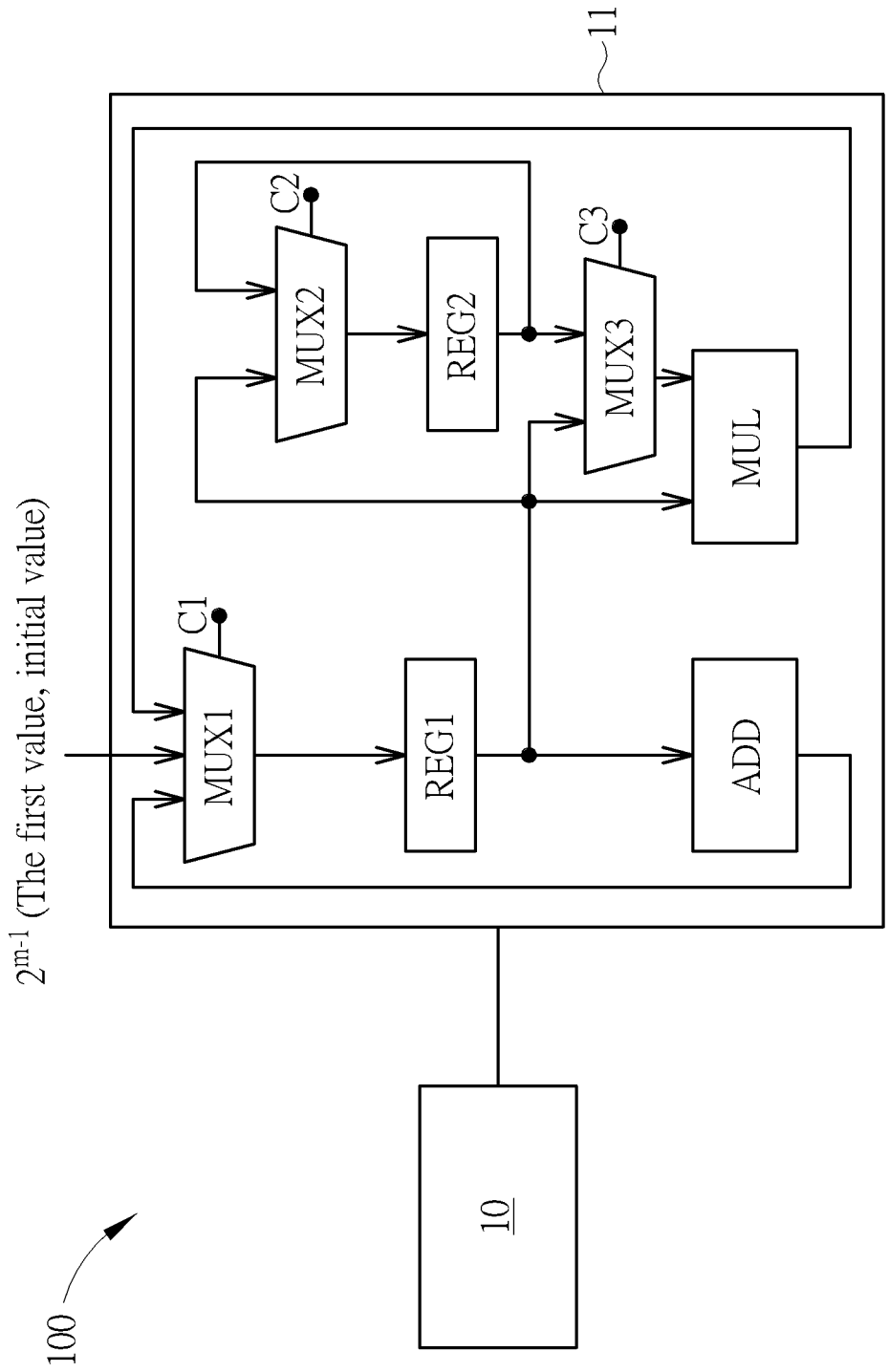
FIG. 1 is a block diagram of a numerical value conversion system according to an embodiment of the present invention.

FIG. 1 is a block diagram of a numerical value conversion system 100 according to an embodiment of the present invention. The numerical value conversion system 100 can convert a value in an integer domain into a value in a Montgomery domain. Further, the numerical value conversion system 100 can be applied to a public-key cryptosystem, but is not limited thereto. The following description first illustrates a definition of Montgomery numerical value conversion. Then, a rapid and low-complexity Montgomery numerical value conversion algorithm of the present invention is also illustrated. Then, circuit structures of embodiments of the numerical value conversion system 100 are also illustrated.

In the Montgomery numerical value conversion, it is assumed that a value A, a value B, and a value C are three values in an integer domain. R is a Montgomery constant. N is a predetermined constant. Correlations between the Montgomery constant R and the predetermined constant N can be written below.

$$R = 2^K \bmod N$$

K is a predetermined positive integer and $K \geq \lceil \log_2 N \rceil \cdot \lceil \bullet \rceil$ is a ceiling function of $\log_2 N$. The value A' in the Montgomery domain corresponding to the value A can be expressed as:

$$A' = (A \times R) \bmod N$$

The value B' in the Montgomery domain corresponding to the value B can be expressed as:

$$B' = (B \times R) \bmod N$$

It is assumed that C=(A×B) mod N. Then, the following equations can be derived.

$$C' = (C \times R) \bmod N$$
$$= (A \times B \times R) \bmod N$$
$$= (A \times R \times B \times R \times R^{-1}) \bmod N$$
$$= (A' \times B' \times R^{-1}) \bmod N$$

In other words, the value A, the value B, and the value C in the integer domain can be converted into the value A', the value B', and the value C' in the Montgomery domain. Therefore, in the Montgomery numerical value conversion, since the Montgomery constant R is deterministic, when the value A is converted into the value A' in the Montgomery domain, the value A can be regarded as the input of the transfer function. Then, the following results of the transfer function for converting A to A' and an inverse transfer function can be derived.

$$(A \times (R^2) \times R^{-1}) \bmod N = (A \times R) \bmod N = A' \text{ and}$$

$$(A' \times (1^2) \times R^{-1}) \bmod N = (A' \times 1 \times R^{-1}) \bmod N$$
$$= ((A \times R) \times R^{-1}) \bmod N$$
$$= A \bmod N$$
$$= A$$

In previously illustrated equations, it can be observed that the computational complex of $R^2$ is high if R is a large number. Therefore, when the value A or the Montgomery constant R in the integer domain is large, computation efficiency may be decreased. Therefore, one goal of designing the numerical value conversion system 100 is to rapidly compute a term of $R^2$ mod N by using low complexity hardware. By doing so, an operational efficiency of the Montgomery numerical value conversion can be increased. Details are illustrated later.

First, according to the definition of the Montgomery numerical value conversion, a first value $T=2^{m-1}$ can be inputted to the numerical value conversion system 100. Here, m is an output of a ceiling function of log 2N, denoted as m=$\lceil \log_2 N \rceil$. N is a constant. Then, according to the first value T, a first modular addition loop can be used for updating the first value T to generate a second value R. The second value R is a modulo operation result of a power-of-two and the constant N. In other words, the second value R can be defined as the Montgomery constant, denoted as $R=2^K$ mod N. Further, a program expression of the first modular addition loop can be written as:

```
For i = 1 to K − m + 1
    T = T + T mod N
end
```

After the first value T is continuously updated by using the first modular addition loop, the first value T becomes the second value R, denoted as $R=2^K$ mod N. K is a first predetermined positive integer. Then, according to the second value R, a second modular addition loop can be used for updating the second value T to generate a third value. The third value is a modulo operation result of a product of the second value R and a power-of-two and the constant N, denoted as $(2^\lambda \times R)$ mod N. R is the second value. λ is a second predetermined positive integer. N is the constant. Further, a program expression of the second modular addition loop can be written as:

```
For j = 1 to λ
    R = R + R mod N
end
```

After the second value R is continuously updated by using the second modular addition loop, the second value R becomes the third value, denoted as $(2^\lambda \times R)$ mod N. Then, the third value $(2^\lambda \times R)$ mod N is inputted to the Montgomery modular exponentiation function for generating the fourth value. The fourth value is a modulo operation result of a square of the first value R and the constant N. In other words, as mentioned previously, the conventional method for generating a term of $R^2$ mod N requires high complexity hardware. However, the numerical value conversion system 100 can rapidly generate the fourth value $R^2$ mod N according to the third value ($2^\lambda \times R$) mod N by using low complexity hardware, as illustrated below.

As previously mentioned, the third value can be expressed as ($2^\lambda \times R$) mod N. $\lambda$ is the second predetermined positive integer. R is the second value. N is the constant. Here, the Montgomery modular exponentiation function can be defined as:

$$(2^E \times R^{-(E-1)}) \bmod N$$

S is a function input. E is a third predetermined positive integer. When the function input S is equal to ($2^\lambda \times R$) mod N, the following result can be derived.

$$(2^{\lambda \times E} \times R^E \times R^{-(E-1)}) \bmod N = (2^{\lambda \times E} \times R) \bmod N$$

In other words, after the function input S=($2^\lambda \times R$) mod N is input to the Montgomery modular exponentiation function, the function output is the fourth value, denoted as ($2^{\lambda E} \times R$) mod N. Similarly, $\lambda$ is the second predetermined positive integer. E is a third predetermined positive integer. Therefore, in the fourth value, when $2^{\lambda \times E}$ is set as $2^K$ (i.e., $\lambda \times E = K$), the fourth value can be derived according to the definition of the Montgomery modular exponentiation function for $R=2^K$ mod N, as illustrated below.

$$\begin{aligned}(2^{\lambda \times E} \times R) \bmod N &= (2^K \times R) \bmod N \\ &= (R \times R) \bmod N \\ &= R^2 \bmod N\end{aligned}$$

The fourth value can be defined as the Montgomery conversion parameter. In other words, in the conventional Montgomery conversion method, it can be observed that the computational complex of $R^2$ is high. Therefore, when the value A or the Montgomery constant R in the integer domain is large, computation efficiency may be decreased. However, by using the Montgomery conversion of the present invention, only two addition loops and the Montgomery modular exponentiation function are required for rapidly generating the fourth value $R=2^K$ mod N (Montgomery conversion parameter).

Further, since the Montgomery conversion parameter $R=2^K$ mod N is derived, the first conversion value A in the integer domain can be converted into the second conversion value A' in the Montgomery domain, as illustrated below. A transfer function used for converting the first conversion value A in the integer domain into the second conversion value A' in the Montgomery domain can be expressed as:

$$(A \times (R^2) \times R^{-1}) \bmod N = (A \times R) \bmod N = A'$$

The first conversion value A is regarded as a function input. The Montgomery conversion parameter $R^2$ mod N is also regarded as a function input. According to the transfer function, the first conversion value A in the integer domain can be converted into the second conversion value A' in the Montgomery domain. Further, in the embodiment, the first value $2^{m-1}$, the second value $R=2^K$ mod N, the third value ($2^{\lambda \times R}$) mod N, and the Montgomery conversion parameter ($2^{\lambda \times E} \times R$) mod $N = R^2$ mod N are positive integers. The function input A is smaller than the constant N (i.e., A<N). Further, the constant N is a positive odd integer.

Figure 2:
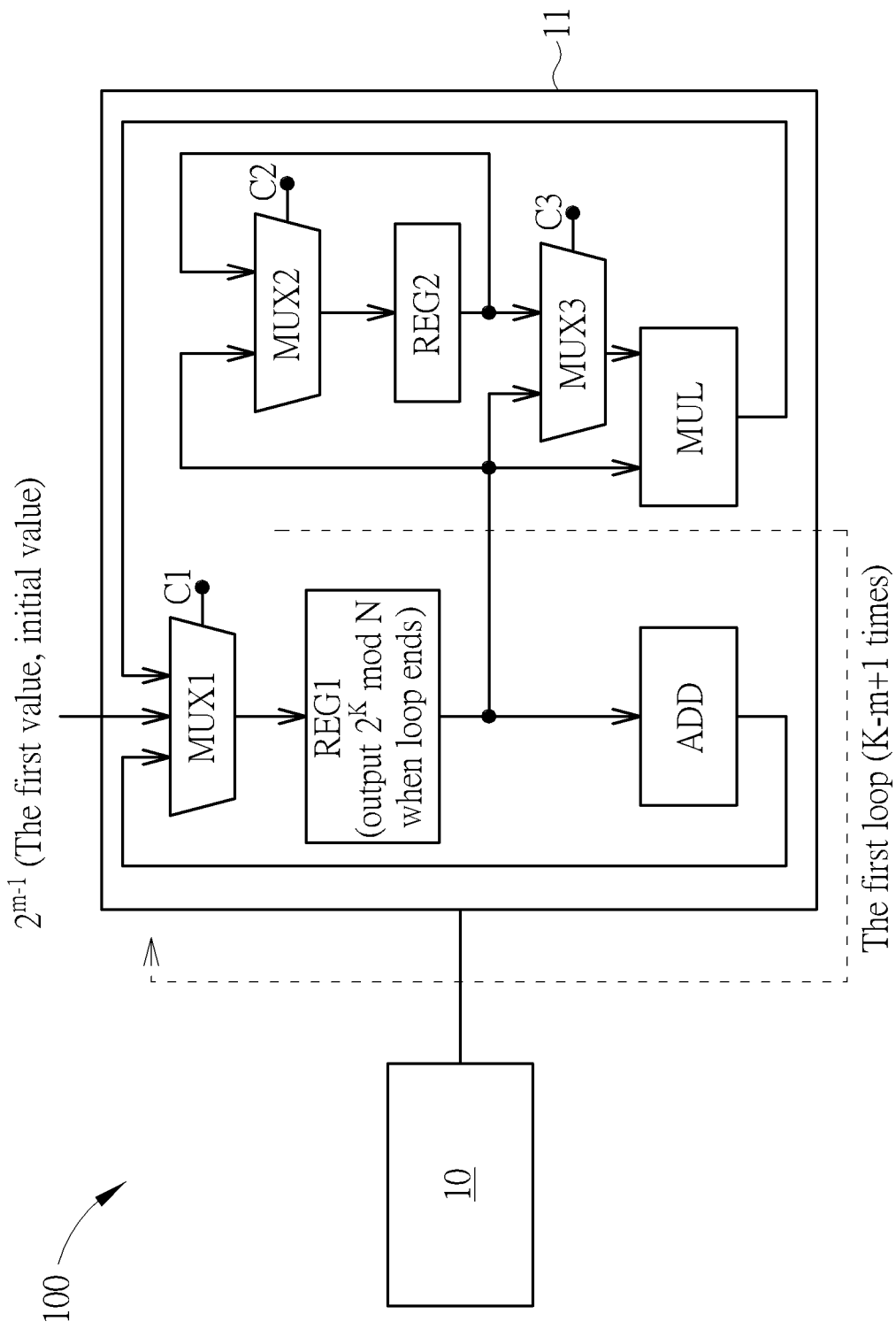
FIG. 2 is an illustration of performing data transmission of a first modular addition loop of the numerical value conversion system in FIG. 1.
Figure 3:
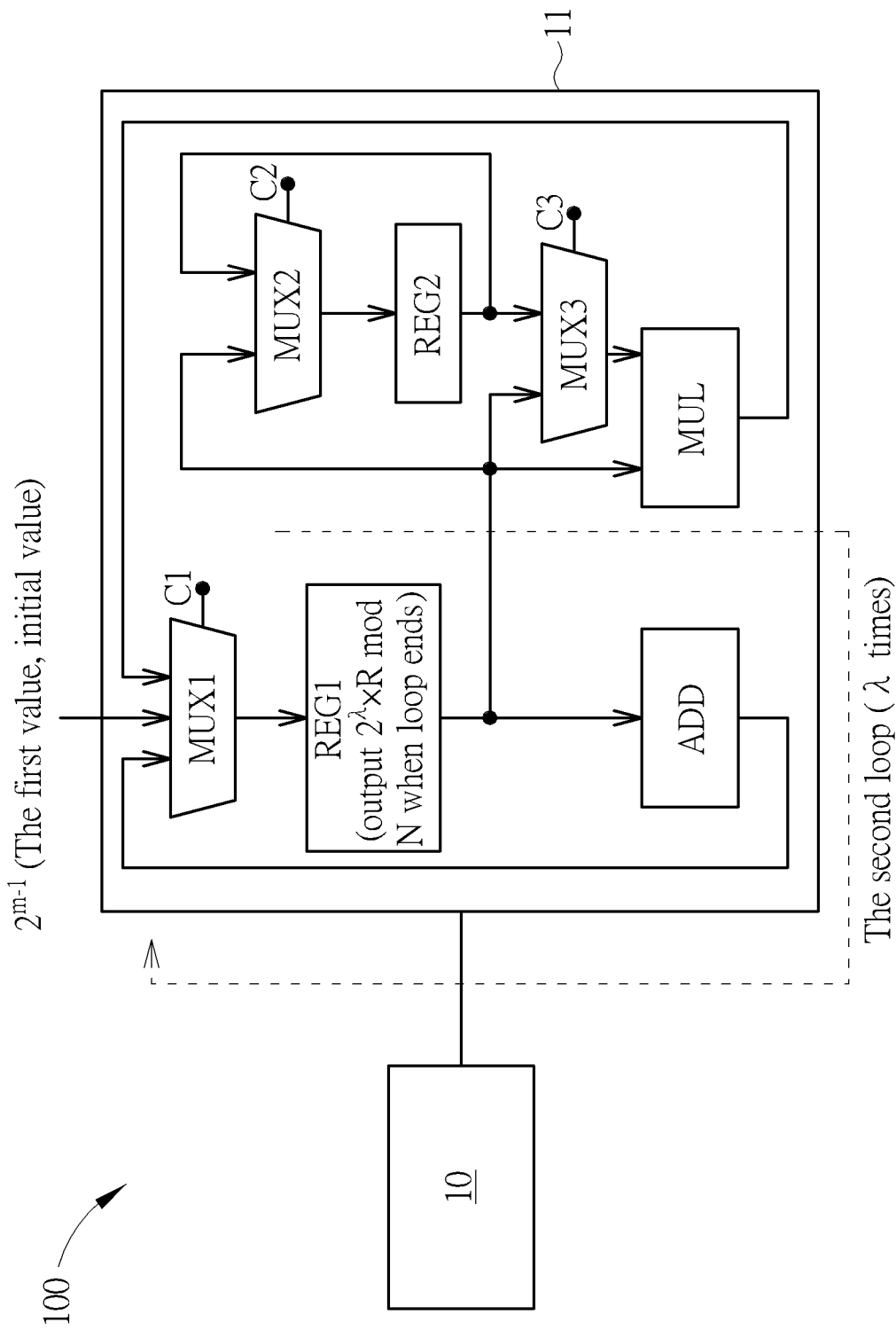
FIG. 3 is an illustration of performing data transmission of a second modular addition loop of the numerical value conversion system in FIG. 1.

FIG. 1 is a block diagram of the numerical value conversion system 100 according to an embodiment of the present invention. FIG. 2 is an illustration of performing data transmission of a first modular addition loop of the numerical value conversion system 100. FIG. 3 is an illustration of performing data transmission of a second modular addition loop of the numerical value conversion system 100. Circuits of the numerical value conversion system 100 can be used for converting the integer domain into the Montgomery domain, as illustrated below. The numerical value conversion system 100 includes a processor 10 and an operation circuit 11. The operation circuit 11 is coupled to the processor 10. The operation circuit 11 includes a first multiplexer MUX1, a first register REG1, a modular adder ADD, a Montgomery multiplier MUL, a second multiplexer MUX2, a second register REG2, and a third multiplexer MUX3. The first register REG1 is coupled to the first multiplexer MUX1. The modular adder ADD is coupled to the first multiplexer MUX1 and the first register REG1. The Montgomery multiplier MUL is coupled to the first multiplexer MUX1 and the first register REG1. The second multiplexer MUX2 is coupled to the first register REG1. The second register REG2 is coupled to the second multiplexer MUX2. The third multiplexer MUX3 is coupled to the first register REG1, the second register REG2, and the Montgomery multiplier MUL. The first multiplexer MUX1, the second multiplexer MUX2, and the third multiplexer MUX3 have control terminals, respectively denoted as control terminals Cl to C3. Further, the processor 10 is coupled to the control terminal Cl to the control terminal C3 for controlling link configurations of the first multiplexer MUX1, the second multiplexer MUX2, and the third multiplexer MUX3. Specifically, the first input terminal of the first multiplexer MUX1 is coupled to the output terminal of the modular adder ADD. The second input terminal of the first multiplexer MUX1 is used for receiving an initial value $2^{m-1}$. The third input terminal of the first multiplexer MUX1 is coupled to the output terminal of the Montgomery multiplier MUL. The first input terminal of the second multiplexer MUX2 is coupled to the output terminal of the first register REG1. The second input terminal of the second multiplexer MUX2 is coupled to the output terminal of the second register REG2. The input terminal of the second register REG2 is coupled to the output terminal of the second multiplexer MUX2. The output terminal of the second register REG2 is coupled to the second input terminal of the second multiplexer MUX2. The first input terminal of the third multiplexer MUX3 is coupled to the output terminal of the first register REG1. The second input terminal of the third multiplexer MUX3 is coupled to the output terminal of the second register REG2. The output terminal of the third multiplexer MUX3 is coupled to the second input terminal of the Montgomery multiplier MUL.

In the numerical value conversion system 100, as shown in FIG. 2, the processor 10 can control the operation circuit 11. After the first multiplexer MUX1 receives the first value $2^{m-1}$, the processor 10 can control the first multiplexer MUX1, the first register REG1, and the modular adder ADD for performing the first modular addition loop. Then, the processor 10 can update the first value by using the first modular addition loop according to the first value for generating the second value $R=2^K$ mod N after a first predetermined loop count (i.e., for example, K−m+1) of the first modular addition loop is reached. The operation of the first modular addition loop is previously illustrated. The loop mechanism can be used for continuously accumulating and updating the first value for generating the second value R=$2^K$ mod N. The first modular addition loop corresponds to a circuit loop including the first multiplexer MUX1, the first register REG1, and the modular adder ADD. After the first value $2^{m-1}$ is inputted from the first multiplexer MUX1 to the first register REG1, the modular adder ADD can be used for accumulating the first value. Before reaching the first predetermined loop count, the processor 10 can control the output terminal of the first multiplexer MUX1 to electrically couple to its first input terminal. The first input terminal of the first multiplexer MUX1 is electrically coupled to the output terminal of the modular adder ADD. Therefore, the first value can be continuously accumulated for updating the first register REG1 until the second value R=$2^K$ mod N is generated. Then, as shown in FIG. 3, the processor 10 can control the first multiplexer MUX1, the first register REG1, and the modular adder ADD of the operation circuit 11 for performing the second modular addition loop (i.e., the processor 10 controls the output terminal of the multiplexer MUX1 to electrically connect to its first input terminal). Then, the processor 10 can update the second value by using the second modular addition loop according to the second value R=$2^K$ mod N outputted from the first register REG1 for generating the third value ($2^\lambda \times R$) mod N after the second predetermined loop count (i.e., $\lambda$) of the second modular addition loop is reached. After the second predetermined loop count is reached, a value buffered in the first register REG1 is the third value ($2^\lambda \times R$) mod N. In other words, an initial value buffered in the first register REG1 can be T=$2^{m-1}$. After the first modular addition loop is completed, the value T buffered in the first register REG1 can be updated to T=R=$2^K$ mod N. After the second modular addition loop is completed, the value T buffered in the first register REG1 can be updated to T=($2^\lambda \times R$) mod N. Then the processor 10 controls the output terminal of the first multiplexer MUX1 to electrically couple to its third input terminal. The third input terminal of the first multiplexer MUX1 is electrically coupled to the output terminal of the Montgomery multiplier MUL. Therefore, the Montgomery multiplier MUL is electrically coupled to the first register REG1. When the Montgomery modular exponentiation function is performed, the processor 10 controls electrical configurations of the second multiplexer MUX2 and the third multiplexer MUX3. Therefore, the Montgomery multiplier MUL can generate ($2^{\lambda \times E} \times R$) mod N according to the value T=($2^\lambda \times R$) mod N buffered in the first register REG1. When the ($2^{\lambda \times E} \times R$) mod N is generated, the value $R^2$ mod N can be acquired by setting K=$\lambda \times E$ and R=$2^K$ mod N. Pseudo codes of performing the Montgomery modular exponentiation function can be expressed below.

For (i=n−2 to 0) begin $T=T^2$;

if($E_i$)T=T×Q;

terminal

Figure 4:
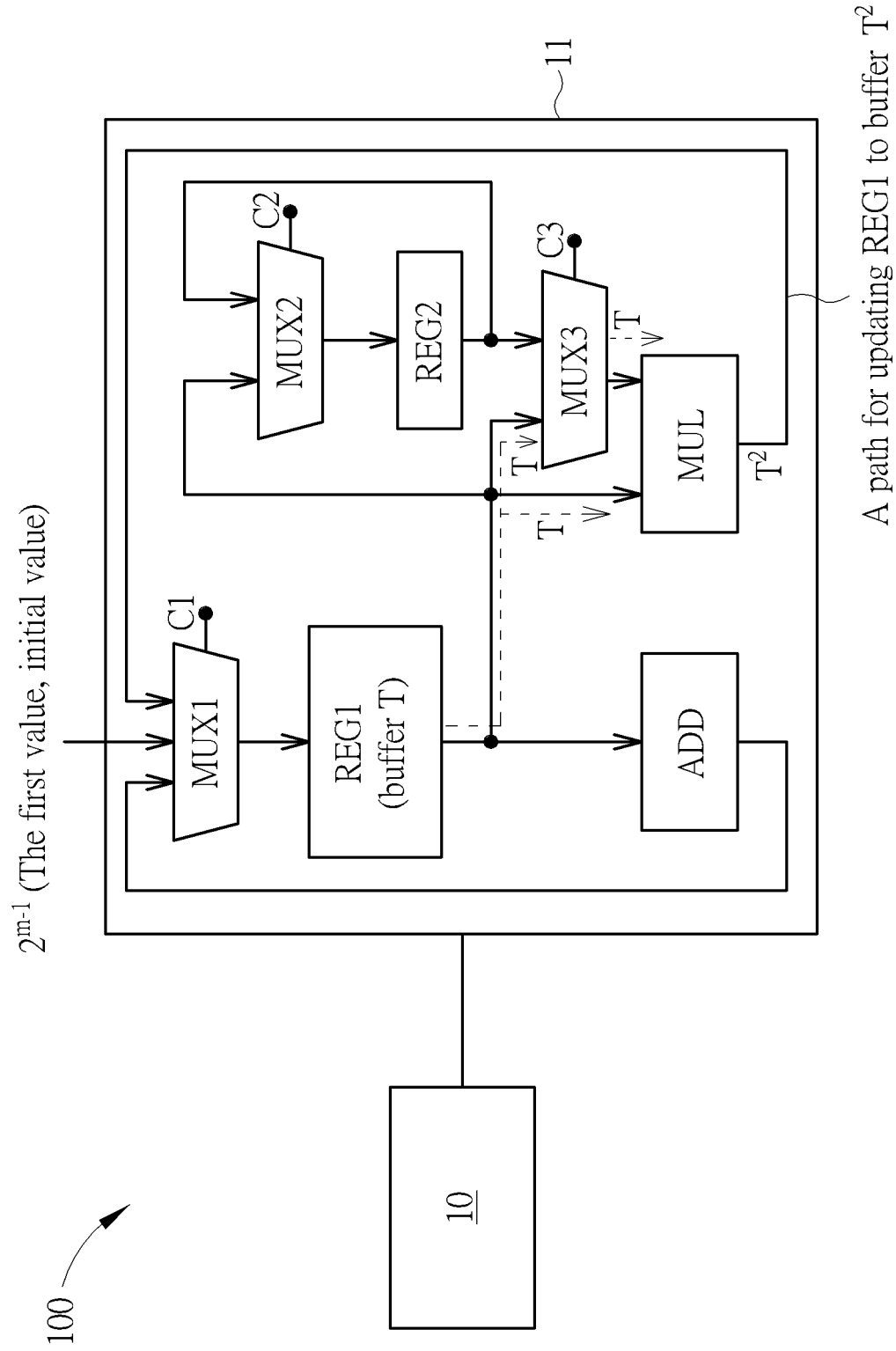
FIG. 4 is an illustration of updating a first register by generating $T^2$ of the numerical value conversion system in FIG. 1.
Figure 5:
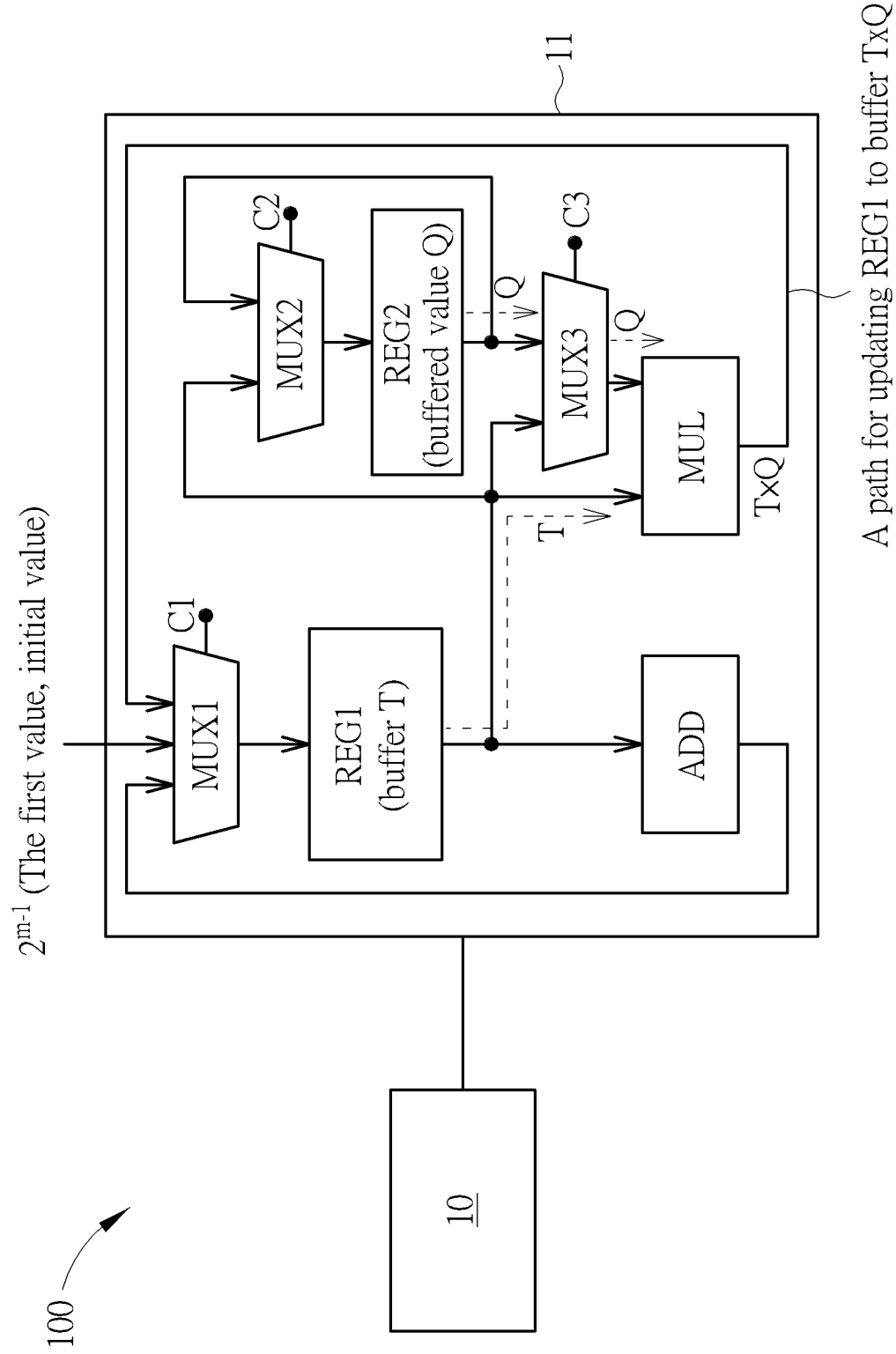
FIG. 5 is an illustration of updating a first register by generating T×Q of the numerical value conversion system in FIG. 1.

In the pseudo codes, each bit Ei of the third predetermined positive integer E can be expressed as ($E_{n-1}, \ldots, E_1, E_0$) and $E_{n-1}$=1. After the value T buffered in the first register REG1 is updated to T=($2^\lambda \times R$) mod N, the operation circuit 11 needs to calculate $T^2$, according to the each bit Ei of the third predetermined positive integer E. As shown in FIG. 4, the processor 10 can control the output terminal of the third multiplexer MUX3 to electrically couple to the first register REG1. In other words, the processor 10 can control the output terminal of the third multiplexer MUX3 to electrically couple to the first register REG1 through the first input terminal of the third multiplexer MUX3. Therefore, both input terminals of the Montgomery multiplier MUL can receive the value T for calculating a value $T^2$. Then, the value $T^2$ can be used for updating the first register REG1 through the first multiplexer MUX1. Further, in the pseudo codes, when at least two bits of the third predetermined positive integer E are equal to "1", the operation circuit 10 needs to calculate T×Q after the value $T^2$ is generated. As shown in FIG. 5, after the value T buffered in the first register REG1 is updated to T=($2^\lambda \times R$) mod N, the processor 10 can control the second terminal of the second multiplexer MUX2 to electrically couple to the input terminal of the second register REG2 and the output terminal of the first register REG1 before the operation circuit 11 generates the value $T^2$. In other words, the processor 10 can control the output terminal of the second multiplexer MUX2 to electrically connect to its first input terminal. Therefore, the value T=($2^\lambda \times R$) mod N can be transmitted from the first register REG1 to the second register REG2 as a buffered value Q. Then, the processor 10 controls the output terminal of the second multiplexer MUX2 to electrically couple to its second input terminal. The processor 10 can control the output terminal of the third multiplexer MUX3 to electrically couple to the second register REG2 according to the bit "1" of the third predetermined positive integer E. In other words, the processor 10 can control the output terminal of the third multiplexer MUX3 to electrically couple to its second input terminal. Therefore, both input terminals of the Montgomery multiplier MUL are respectively coupled to the first register REG1 and the second register REG2. In other words, one input terminal of the Montgomery multiplier MUL receives the value T buffered in the first register REG1. The other input terminal of the Montgomery multiplier MUL receives the buffered value Q of the second register REG2. Then, the Montgomery multiplier MUL can output T×Q. Further, the value T×Q can be transmitted to the first register REG1 as the updated T through the first multiplexer MUX1. Finally, when the Montgomery multiplier MUL completes generating the value $T^2$ for each bit of the third predetermined positive integer E (i.e., Ei=0) or completes generating the value T×Q for each bit of the third predetermined positive integer E (i.e., Ei=1), the third value ($2^\lambda \times R$) mod N can be converted into the fourth value ($2^{\lambda \times E} \times R$) mod N by performing the Montgomery modular exponentiation function. As a result, as mentioned previously, the processor 10 can convert the first conversion value A in the integer domain into the second conversion value A' in the Montgomery domain according to the fourth value ($2^{\lambda \times E} \times R$) mod N by using the transfer function (A×($R^2$)× $R^{-1}$) mod N. In some embodiments, the processor 10 is a digital signal processor (DSP) or an application specific integrated circuit (ASIC) capable of performing the Montgomery conversion function.

Figure 6:
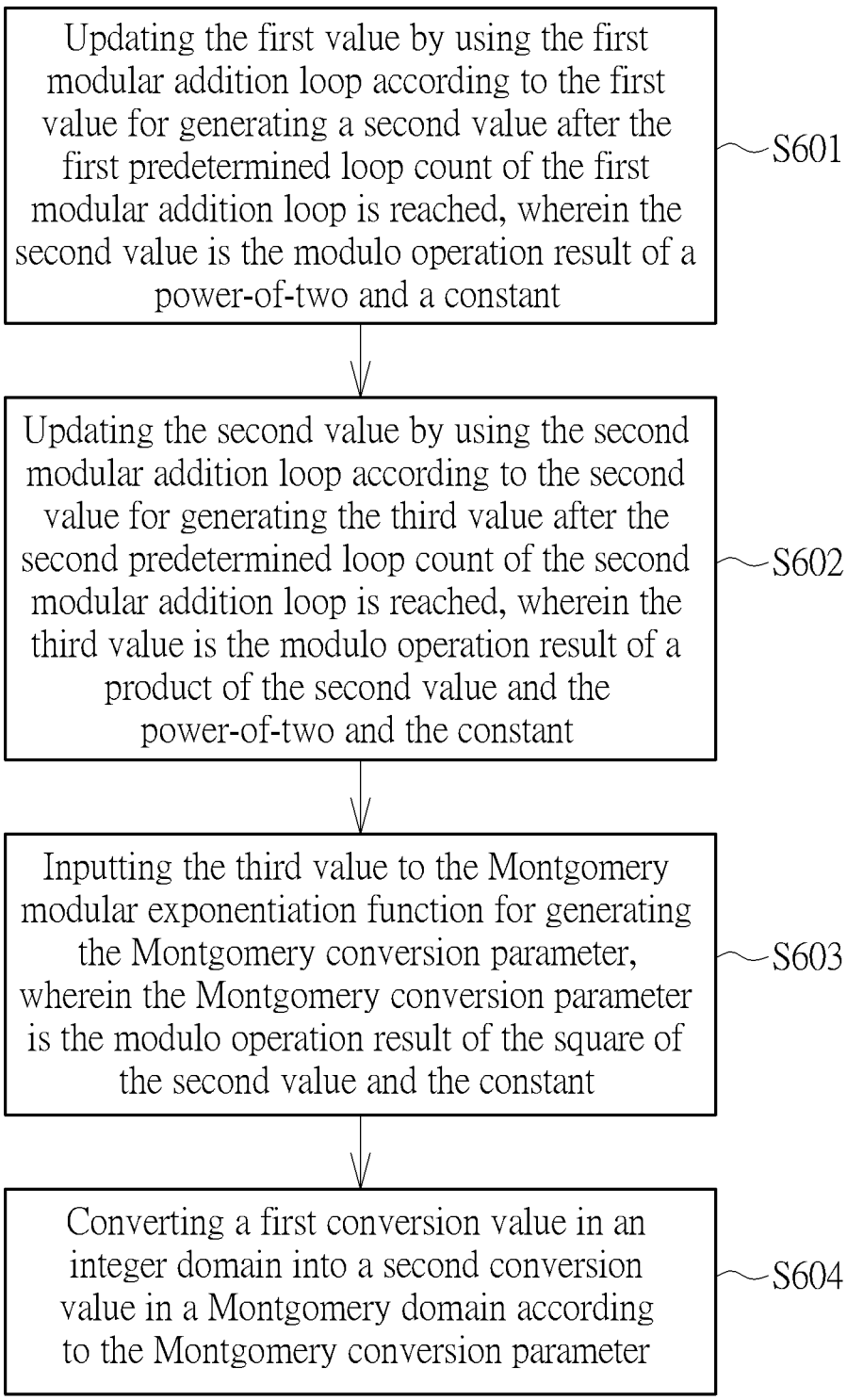
FIG. 6 is a flow chart of performing the numerical value conversion method by the numerical value conversion system in FIG. 1.

FIG. 6 is a flow chart of performing the numerical value conversion method by the numerical value conversion system 100. The numerical value conversion method includes step S601 to step S604. Any reasonable technology modification falls into the scope of the present invention. Step S601 to step S604 are illustrated below.

step S601: updating the first value by using the first modular addition loop according to the first value for generating a second value after the first predetermined loop count of the first modular addition loop is reached, wherein the second value is the modulo operation result of a power-of-two and a constant;

step S602: updating the second value by using the second modular addition loop according to the second value for generating -continued

| | |
|---|---|
| | the third value after the second predetermined loop count of the second modular addition loop is reached, wherein the third value is the modulo operation result of a product of the second value and the power-of-two and the constant; |
| step S603: | inputting the third value to the Montgomery modular exponentiation function for generating the Montgomery conversion parameter, wherein the Montgomery conversion parameter is the modulo operation result of the square of the second value and the constant; |
| step S604: | converting a first conversion value in an integer domain into a second conversion value in a Montgomery domain according to the Montgomery conversion parameter. |

Details of step S601 to step S604 are previously illustrated. Thus, they are omitted here. In the numerical value conversion system 100, since the numerical value conversion method can be performed by using low complexity hardware loops for generating the Montgomery conversion parameter $R^2$ mod N, when the first conversion value in the integer domain is converted into the second conversion value in the Montgomery domain, computing efficiency can be increased.

To sum up, the present invention discloses a numerical value conversion method and a numerical value conversion system for converting the first conversion value in the integer domain into the second conversion value in the Montgomery domain. Instead of generating the Montgomery conversion parameter in a limited value range by using high complexity hardware, the numerical value conversion method can generate the Montgomery conversion parameter without any limitation (i.e., non-constrained by $2^k$ and k is a value of the power of two). Therefore, when the numerical value conversion system of the present invention is applied to a public key cryptography system, even if the value of the public key is very large, or the number of public keys is very large, the numerical value conversion system can generate the Montgomery conversion parameter and perform the Montgomery conversion from the integer domain to the Montgomery domain by using linear complexity hardware. In other words, in the numerical value conversion system, the computing efficiency of converting the first conversion value in the integer domain into the second conversion value in the Montgomery domain can be increased.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A numerical value conversion method for a public key cryptography system, comprising:
  receiving a first conversion value in an integer domain;
  converting the first conversion value from the integer domain to a second conversion value in a Montgomery domain by steps of:
    updating a first value by using a first modular addition loop according to the first value for generating a second value after a first predetermined loop count of the first modular addition loop is reached;
    updating the second value by using a second modular addition loop according to the second value for generating a third value after a second predetermined loop count of the second modular addition loop is reached;
  inputting the third value to a Montgomery modular exponentiation function for generating a Montgomery conversion parameter, wherein the Montgomery conversion parameter is a modulo operation result of a square of the second value and a constant; and
  converting the first conversion value into a second conversion value according to the Montgomery conversion parameter;
  performing a public key cryptographic algorithm using the second conversion value in the Montgomery domain to generate a cryptographic result; and
  converting the cryptographic result from the Montgomery domain to the integer domain for use in cryptographic operations;
  wherein the first value is denoted as T, the first modular addition loop is recited as a formula: T=(T+T) mod N, the first predetermined loop count is equal to K−m+1, the first value is equal to $2^{m-1}$, m is an output value of a ceiling function of $\log_2 N$, K is a first predetermined positive integer, N is the constant, and when the first modular addition loop reaches the first predetermined loop count, the second value is equal to R=$2^K$ mod N, the second modular addition loop is recited as a formula: R=(R+R) mod N, the second predetermined loop count is 2, when the second modular addition loop reaches the second predetermined loop count, the third value is equal to ($2^\lambda \times R$) mod N, and λ is a second predetermined positive integer, and the constant is a positive odd integer.

2. The method of claim 1, wherein the first value, the second value, the third value, and the Montgomery conversion parameter are positive values.

3. The method of claim 1, wherein the Montgomery modular exponentiation function is recited as a formula: ($S^E \times R^{-(E-1)}$) mod N, S is a function input, E is a third predetermined positive integer, when the function input is equal to ($2^\lambda \times R$) mod N, an output of the Montgomery modular exponentiation function is equal to the Montgomery conversion parameter, denoted as ($2^{\lambda \times E} \times R$) mod N.

4. The method of claim 3, further comprising:
  setting the first predetermined positive integer K as λ×E so that the Montgomery conversion parameter is equal to $R^2$ mod N.

5. The method of claim 1, wherein converting the first conversion value in the integer domain into the second conversion value in the Montgomery domain according to the Montgomery conversion parameter comprising:
  converting the first conversion value to the second conversion value by using a transfer function;
  wherein an expression of the transfer function is (A×($R^2$)×$R^{-1}$) mod N, A is the first conversion value, the Montgomery conversion parameter is equal to $R^2$ mod N, a reciprocal of the second value is $R^{-1}$, N is the constant, and A is smaller than the constant (A<N).

6. A numerical value conversion system for a public key cryptography system, comprising:
  a processor, and
  an operation circuit coupled to the processor, the operation circuit comprising:
    a first multiplexer;
    a first register coupled to the first multiplexer;
    a modular adder coupled to the first multiplexer and the first register; and
    a Montgomery multiplier coupled to the first multiplexer and the first register;
  wherein the processor receives a first conversion value in an integer domain, and converts the first conversion value from the integer domain to a second conversion value in a Montgomery domain by performing steps of:

controlling the first multiplexer, the first register, and the modular adder for generating a first modular addition loop, wherein after the first multiplexer receives a first value, the processor updates the first value by using the first modular addition loop according to the first value for generating a second value after a first predetermined loop count of the first modular addition loop is reached, and the second value is buffered in the first register;

controlling the first multiplexer, the first register, and the modular adder for generating a second modular addition loop, wherein the processor updates the second value by using the second modular addition loop according to the second value for generating a third value buffered in the first register after a second predetermined loop count of the second modular addition loop is reached;

controlling the Montgomery multiplier for executing a Montgomery modular exponentiation function according to the third value, wherein the Montgomery modular exponentiation function is used for generating a Montgomery conversion parameter, the Montgomery conversion parameter is a modulo operation result of a square of the second value and a constant; and converting the first conversion value into a second conversion value according to the Montgomery conversion parameter;

the processor performs a public key cryptographic algorithm using the second conversion value in the Montgomery domain to generate a cryptographic result, and the processor converts the cryptographic result from the Montgomery domain to the integer domain for use in cryptographic operations; and wherein the first value is denoted as T, the first modular addition loop is recited as a formula: T=(T+T) mod N, the first predetermined loop count is equal to K−m+1, the first value is equal to $2^{m-1}$, m is an output of a ceiling function of log2N, K is a first predetermined positive integer, N is the constant, and when the first modular addition loop reaches the first predetermined loop count, the second value is equal to R=$2^K$ mod N, the second modular addition loop is recited as a formula: R=(R+R) mod N, the second predetermined loop count is 2, when the second modular addition loop reaches the second predetermined loop count, the third value is equal to ($2^\lambda$×R) mod N, and A is a second predetermined positive integer, and the constant is a positive odd integer.

7. The system of claim 6, wherein the first multiplexer comprises:
a first input terminal coupled to an output terminal of the modular adder;
a second input terminal configured to receive the first value;
a third terminal coupled to an output terminal of the Montgomery multiplier; and
an output terminal coupled to the first register;

wherein the processor controls the output terminal of the first multiplexer to be electrically coupled to the first input terminal of the first multiplexer through the first register and the modular adder for accumulating the first value and the second value.

8. The system of claim 7, wherein a first input terminal of the Montgomery multiplier is coupled to an output terminal of the first register, the operation circuit further comprises:
a second multiplexer comprising:
a first input terminal coupled to the output terminal of the first register;
a second input terminal; and
an output terminal;
a second register comprising:
an input terminal coupled to the output terminal of the second multiplexer; and
an output terminal coupled to the second input terminal of the second multiplexer; and
a third multiplexer comprising:
a first input terminal coupled to the output terminal of the first register;
a second input terminal coupled to the output terminal of the second register; and
an output terminal coupled to a second input terminal of the Montgomery multiplier.

9. The system of claim 8, wherein after the third value is generated, the processor controls the output terminal of the second multiplexer to electrically couple to the first input terminal of the second multiplexer, when the Montgomery modular exponentiation function is performed, the processor controls the output terminal of the first multiplexer to electrically couple to the third input terminal of the first multiplexer, the processor controls the output terminal of the second multiplexer to electrically couple to the second input terminal of the second multiplexer, and the processor controls the output terminal of the third multiplexer to electrically couple to the first input terminal or the second input terminal of the third multiplexer according to a bit "1" or a bit "0" of a third predetermined positive integer.

10. The system of claim 6, wherein the Montgomery modular exponentiation function is ($S^E$×$R^{-(E-1)}$) mod N, S is a function input, E is a third predetermined positive integer, when the function input is equal to ($2^\lambda$×R) mod N, an output of the Montgomery modular exponentiation function is equal to the Montgomery conversion parameter, denoted as ($2^{\lambda \times E}$×R) mod N.

11. The system of claim 10, wherein the processor sets the first predetermined positive integer K as λ×E so that the Montgomery conversion parameter is equal to $R^2$ mod N.

12. The system of claim 6, wherein the processor converts the first conversion value to the second conversion value by using a transfer function, an expression of the transfer function is (A×($R^2$)×$R^{-1}$) mod N, A is the first conversion value, the Montgomery conversion parameter is equal to $R^2$ mod N, a reciprocal of the second value is $R^{-1}$, N is the constant, and A is smaller than the constant (A<N).

* * * * *